United States Patent [19]

Fesco

[11] 4,240,813
[45] Dec. 23, 1980

[54] REINFORCED VACUUM CLEANER FILTER BAG

[75] Inventor: John E. Fesco, South Hempstead, N.Y.

[73] Assignee: Studley Paper Company, Inc., Inwood, N.Y.

[21] Appl. No.: 50,418

[22] Filed: Jun. 20, 1979

[51] Int. Cl.³ .............................................. B01D 46/02
[52] U.S. Cl. .................... 55/381; 55/DIG. 2; 229/55
[58] Field of Search ............ 55/381, DIG. 2; 229/55

[56] References Cited

U.S. PATENT DOCUMENTS

| | | | |
|---|---|---|---|
| 1,909,683 | 5/1933 | Jonas | 229/55 |
| 2,116,571 | 5/1938 | Gurwick | 229/55 X |
| 2,157,392 | 5/1939 | Williams | 229/55 |
| 2,664,239 | 12/1953 | Vogt | 229/55 |
| 2,848,063 | 8/1958 | Meyerhoefer | 55/381 X |
| 3,350,859 | 11/1967 | Fesco | 55/381 X |
| 3,404,515 | 10/1968 | Fesco | 55/381 x |
| 3,559,381 | 2/1971 | Fesco | 55/381 X |
| 3,859,064 | 1/1975 | Cordell | 229/55 X |

FOREIGN PATENT DOCUMENTS 1070953  8/1954  France ...................................... 229/55
338170  11/1930  United Kingdom ....................... 229/55

Primary Examiner—Kathleen J. Prunner
Attorney, Agent, or Firm—Friedman, Goodman & Teitelbaum

[57] ABSTRACT

A vacuum cleaner filter bag formed from a blank including a sheet of air permeable filter paper, and which is folded to define a tubular container having closed ends with an access opening formed in the container for permitting the passage of air into the interior of the bag so that the air can be filtered. The bag is formed by folding the blank and applying adhesive material onto specific areas during the folding operation in order to form the bag. On the blank itself there is also pre-applied, by preprinting or extruding, a heat, selfstick or pressure sensitive type of adhesive material on specified areas, these areas being susceptible to tears. After the bag is formed, it is passed through a heat or pressure applying station which activates the preprinted or extruded adhesive material thereby providing reinforcement to the bag at the areas which tend to tear.

13 Claims, 18 Drawing Figures

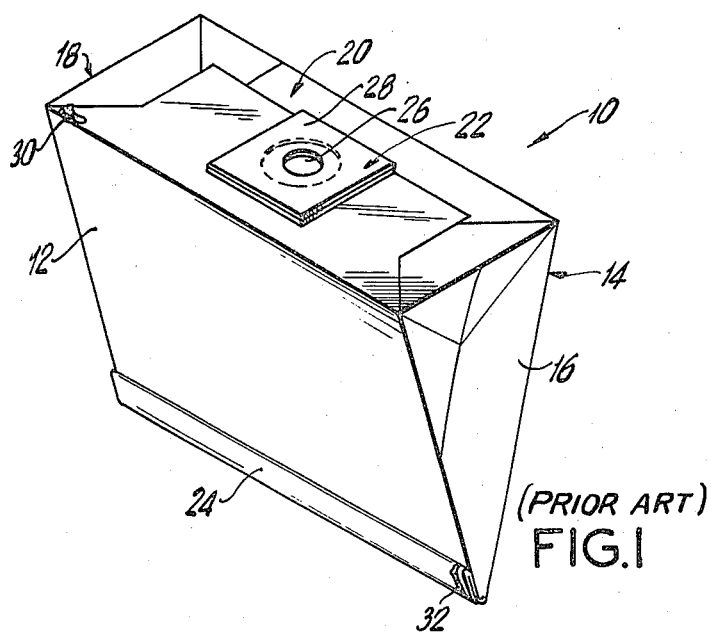
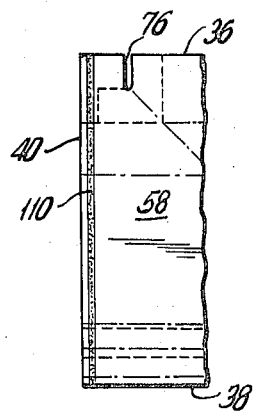
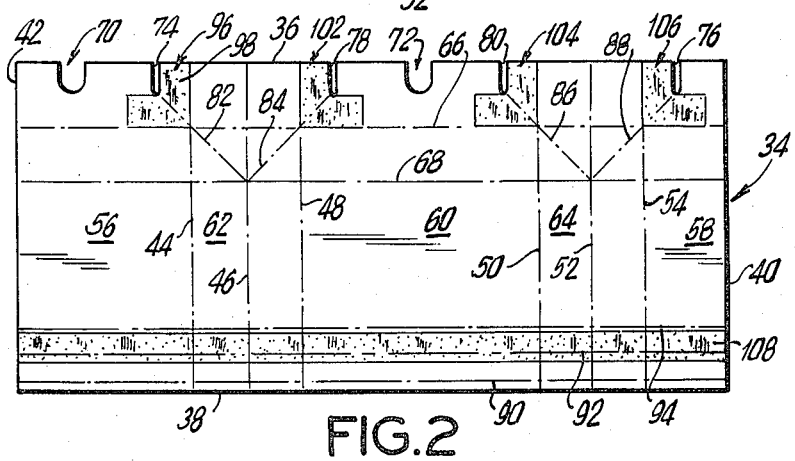
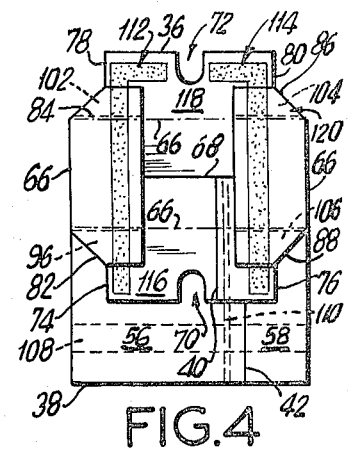
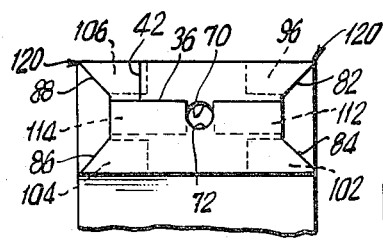
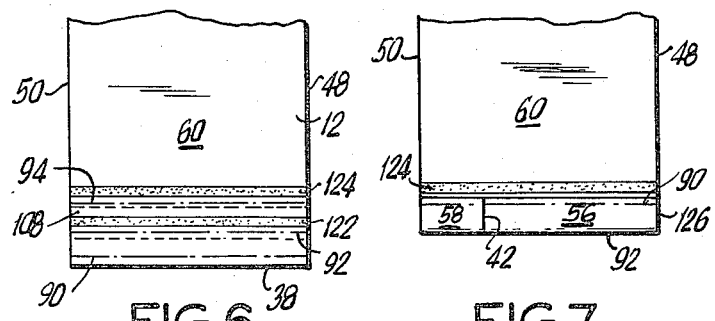
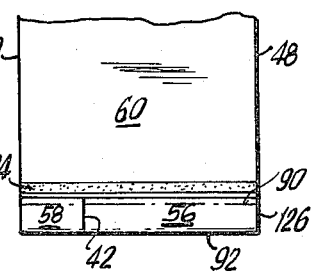
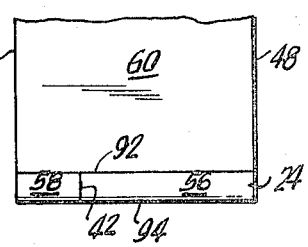

REINFORCED VACUUM CLEANER FILTER BAG

BACKGROUND OF THE INVENTION

This invention relates generally to vacuum cleaner filter bags and more particularly to a reinforced vacuum cleaner filter bag.

Vacuum cleaner filter bags are typically formed from a blank which contains fold lines and cut-outs. The blank is folded on the specified lines and adhesive is applied during the course of the folding process whereby the filter bag is completed. Typically, such filter bags are folded into a tubular shape having closed ends with access means formed in the tubular bag for permitting passage of air into the interior of the bag so that the air can be filtered.

The specified structure of the bag may vary depending upon the type of vacuum cleaner being utilized. For example, one typical filter bag is in the shape of a conventional paper bag having a folded over edge on one end thereof and a bag bottom at the other end thereof. An opening is formed in the bag bottom which serves as the access means to permit the entry of air into the interior of the bag. The opening can then be connected to the vacuum cleaner outlet. Such a vacuum cleaner filter bag is described in U.S. Pat. No. 3,404,515.

With the aforementioned bag, a blank of sheet material is formed with the appropriate fold lines and cut-outs. Adhesive is placed along the longitudinal edge to permit the formation of an overlapped seam and the sheet is folded around to form a tubular structure. Then, the bottom is formed by appropriately folding the material. After the material is folded partway during the formation of the bottom, glue is applied in stripes and the material is then folded over to complete formation of the bottom. Transverse stripes of glue are then applied at the other end and the tubular material is folded onto itself to close off and seal the other end.

Another type of filter bag structure is the type having a long tubular body with both the upper and lower ends closed off by folding onto itself. An opening is formed in the tubular material and a separate connecting tube having an opening registered with the opening in the tubular body is connected. The connecting tube has its remote end available for connection to the vacuum cleaner outlet and the connecting tube serves as a passageway for the air into the filter bag.

This type of vacuum cleaner bag is described in U.S. Pat. Nos. 3,350,859 and 3,559,381. In this type of bag, a series of longitudinal fold lines are formed on the blank and the blank is folded around to form a tubular body having a front and rear panel and accordian side panels. Glue is provided in order to form an overlapping seam. Glue is also applied transversely at the upper and lower edges and the ends are then folded over onto itself to form a closed off cuff at the top and bottom portion. Adhesive is also placed around the registered openings to permit coupling of the connecting tube onto the tubular body.

With both aforementioned types of vacuum cleaner filter bags, as well as with other types, although the filter bag is closed and appropriate adhesive is utilized for sealing and holding the bag closed, there is a tendency for rips and tears to occur at heavily stressed portions. Typically, tears will occur at the edges where the bag has been folded over in order to close off the bag. For example, at the folded over cuff portion, there will frequently occur tears or rips. Also, in the type of bag having a bottom, at the corners of the bottom, tears and rips tend to occur. Although additional adhesive can be applied, since the adhesive is normally applied in stripes, it would necessitate applying a large amount of adhesive covering an excessive amount of area greater than the amount under stress. This would cause exposed adhesives which would be wet, tacky, and tend to stick to other adjacent bags during the course of processing.

SUMMARY OF THE INVENTION

Accordingly, it is an object of the present invention to provide a vacuum cleaner filter bag which avoids the aforementioned problems of prior art filter bags.

Another object of the present invention is to provide a reinforced vacuum cleaner filter bag.

Still another object of the present invention is to provide a vacuum cleaner filter bag having preprinted or extruded adhesive areas which are provided in locations which tend to tear, and accordingly, provide reinforcement to the filter bag.

Yet another object of the present invention is to provide a vacuum cleaner filter bag formed from a blank of air permeable filter sheet material which includes preprinted or extruded heat, self-stick or pressure sensitive adhesives in specified areas which are susceptible to tears and rips, and accordingly, provides reinforcement to the filter bag.

A further object of the present invention is to provide a vacuum cleaner filter bag formed from a blank of air permeable sheet material which includes a first type of adhesive utilized during the course of the folding and sealing operations and a second type of adhesive which is preprinted or extruded onto the blank and is heat, self-stick or pressure sensitive.

Another object of the present invention is to provide a vacuum cleaner filter bag formed from a blank of sheet material which utilizes quick setting, slow drying resin adhesive during the course of the folding and forming of the bag, as well as a heat, self-stick or pressure sensitive adhesive preprinted or extruded on the blank for reinforcing specified areas of the filter bag.

Another object of the present invention is to provide a blank for a vacuum cleaner filter bag having appropriate fold lines and cut-outs for forming the bag, and including preprinted or extruded adhesive material on specified area of the blank.

Still another object of the present invention is to provide a blank for a vacuum cleaner filter bag formed of air permeable filter sheet material and including preprinted or extruded heat, self-stick or pressure sensitive adhesives positioned in stripes on the inside of the blank for preventing tears at the edges of the bag, when in a folded condition.

Another object of the present invention is to provide a method of manufacturing a reinforced vacuum cleaner filter bag.

A further object of the present invention is to provide a method of manufacturing a vacuum cleaner filter bag by utilizing a blank having preprinted or extruded heat, self-stick or pressure sensitive adhesive areas on specified locations and by applying heat or pressure onto the filter bag after it is folded and sealed into its final form.

Briefly, in accordance with the present invention, there is provided a vacuum cleaner filter bag which is formed from a blank of air permeable filter sheet material which is folded to define a tubular bag having closed ends. An access means is formed in the tubular bag for permitting passage of the air to be filtered into the interior of the bag. A first adhesive material is applied onto specific areas of the blank for sealing the bag in its folded condition. A second, heat, self-stick or pressure sensitive adhesive material is preprinted or extruded onto the blank in other specified areas, and specifically adjacent to the ends, in order to prevent tears at the closed ends and provide reinforcement to the bags.

The present invention also contemplates a blank for a vacuum cleaner filter bag, comprising a sheet of air permeable filter material which is provided with a pair of transverse edges and a plurality of elongated fold lines for defining therebetween a front panel, side panels, and a rear panel, when the blank is folded thereon. A cut-out section is formed on the blank for forming access means into the filter bag when it is folded. A heat, self-stick or pressure sensitive adhesive material is preprinted or extruded in stripes on the blank adjacent the transverse edges for preventing tears at the edges of the bag, when it is in a folded condition.

The invention also contemplates a method of manufacturing a vacuum cleaner filter bag comprising the steps of forming a blank from an air permeable filter material, having the necessary fold lines and cut-outs which are needed to form the desired filter bag configuration. A heat, self-stick or pressure sensitive adhesive material is printed or extruded onto the blank in specified areas which are susceptible to tears. The bag is folded and glued into its final form utilizing additional adhesives disposed on other areas as needed. Heat or pressure is then applied to the folded filter bag in order to activate the heat, self-stick or pressure sensitive adhesive material, thereby providing the extra reinforcement to the filter bag.

BRIEF DESCRIPTION OF THE DRAWINGS

With the above and additional objects and advantages in view, as will hereinafter appear, this invention comprises the devices, combinations and arrangements of parts hereinafter described by way of example and illustrated in the accompanying drawings of a preferred embodiment in which:

FIG. 1 is a perspective view of one type of prior art vacuum cleaner filter bag, and showing the problems with the prior art filter bags;

FIG. 2 is a plan view of a blank utilized in the manufacture of the type of vacuum cleaner filter bag of FIG. 1, and including the features of the present invention;

FIG. 3 is a fragmentary plan view of the blank during the course of the manufacture of the bag, and specifically showing the side edge with the application of glue for a seam;

FIG. 4 is an elevational view of the bag showing the formation of the bag bottom;

FIG. 5 is a fragmentary bottom view showing the completed bag bottom;

FIGS. 6, 7 and 8 illustrate successive steps in closing off the opposing end of the filter bag;

DETAILED DESCRIPTION OF THE PREFERRED EMBODIMENT

Figure 9:
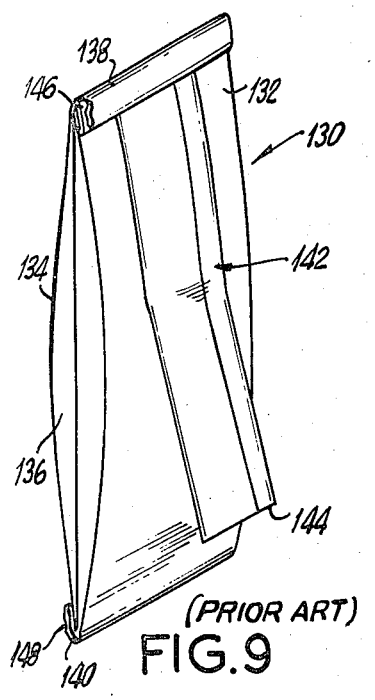
FIG. 9 is a perspective view of another type of prior art vacuum cleaner filter bag, and showing the problems of the prior art filter bags.

Referring now to FIG. 1, there is shown a filter bag 10 which has generally been known in the prior art and which is specifically described in U.S. Pat. No. 3,404,515. This patent is herein incorporated by reference in its entirety.

In the aforementioned patent, it is described that the filter bag includes a front panel 12, a rear panel 14, gusseted side panels 16 and 18, a bag bottom, shown generally at 20, an access means 22 for entering into the interior of the bag bottom, and a folded up cuff 24 at the lower edge which seals the bag. An opening 26 is provided in the bag bottom and forms a part of the access means 22. A collar 28 surrounds the opening 26 and provides reinforcement for the opening. The filter bag is connected to an outlet in the vacuum cleaner and receives the air to be filtered.

As is described in the aforementioned patent, during the course of the folding and formation of the filter bag from a blank of sheet material, glue is applied to specific areas to hold the parts of the bag together. For example, glue would be applied transversely across the lower end of the folded bag prior to the formation of the cuff 24. The cuff would then be folded over the glued area to seal the lower end of the bag. Similarly, prior to the folding of the bag bottom, stripes of glue would be applied to various exterior surfaces of the bag bottom and then the folding would occur to retain the various flaps of the bag bottom in place.

It has been found, that during the course of use and continuous utilization of the filter bag, there is a tendency for tears and rips to occur at specifically sensitive areas, for example at the corners. As is best seen in FIG. 1, at each corner edge 30 of the bag bottom there will be a tendency for the filter bag to tear and rip during continuous use. Similarly, adjacent each end 32 of the cuff 24 there will also be a tendency for the filter bag to tear and rip. Such tears occur both because of the continuous expansion which is created by the entering air, as well as the continuous rubbing of the filter bag against adjacent parts within the vacuum cleaner.

Although glue is utilized to hold the filter bag together in its final form, these specific areas will still have a tendency to rip. The glue is usually applied only to the areas which are sealed together. However, the corners, especially the bag bottom corners, generally do not receive such glue and accordingly at those corners there is no adhesive for sealing, and therefore air pockets are formed at these corners.

Referring now to FIG. 2, there is shown the blank 34 of sheet material which is utilized in the formation of the improved, reinforced vacuum cleaner filter bag of the present invention. The blank 34 is in a pattern which is substantially the same as that described in the aforementioned patent. However, formed on the blank is a preprinted or extruded adhesive which is provided in specified areas in order to avoid the aforementioned tears and rips by providing sufficient reinforcement to the filter bags to avoid the above mentioned air pockets. The pattern on the blank sheet will only be briefly described. For a more detailed description of the blank itself as well as the construction and manufacture of the filter bag from such blank, reference is made to the aforementioned patent.

Briefly, the blank is a substantially rectangular shape including opposing transverse lateral edges 36, 38 and opposing longitudinal edges 40, 42. A plurality of longitudinal fold lines are provided. Specifically, a group of three longitudinal fold lines 44, 46 and 48 are positioned on the left side of the blank and another three longitudinal fold lines 50, 52, 54 are positioned on the right side. The longitudinal fold lines provide a portion 56 of the front panel and also provides a portion 58 on the opposing end. These two portions 56, 58 will be sealed together to form a continuous front panel. A rear panel 60 is formed in the center of the blank, a side panel 62 is formed between the fold lines 44 and 48, and a corresponding side panel 64 is formed between the fold lines 50 and 54. The side panels 62 and 64 are gusseted with the fold line 46 and 52 respectively forming the internal fold lines for the respective gusseted side panel.

A plurality of transverse fold lines are also formed. Specifically, adjacent the transverse marginal edge 36 there are formed the two transverse fold lines 66 and 68. These define the portions for subsequent formation of the bag bottom. A U-shaped notch 70 is formed in the front panel 56 and a corresponding U-shaped notch 72 is formed in the rear panel 60. The U-shaped notches extend from the transverse marginal edge 36 inwardly at least partway toward the transverse fold line 66.

Spaced on either side of the notches are longitudinal slits. In the front panel 56, the slit 74 is provided on one side of the notch 70, and the slit 76 is formed, for positioning on the other side of the notch 70, in the portion 58 of the other front panel. Corresponding slits are formed on either side of the U-shaped notch 72 in the rear panel, and specifically include the longitudinal slits 78 and 80. Each of the slits extend downwardly approximately the same distance as the U-shaped notch.

Diagonal fold lines extend from the lower edge of each slit. The diagonal fold lines from the front and rear panels respectively are directed towards each other and intersect along the transverse fold line 68. Specifically, the diagonal fold line 82 from the slit 74 intersects at the fold line 46 with diagonal fold line 84 from the slit 78. Similarly, the diagonal fold line 86 from the slit 80 intersects at the fold line 52 with the diagonal fold line 88 from the slit 76.

At the other end, adjacent the transverse marginal edge 38, there are also provided a plurality of transverse fold lines. Specifically, there are three transverse fold lines 90, 92, and 94 which are approximately equidistantly spaced apart. Thus far, the blank sheet of material is substantially as is described in the aforementioned U.S. Patent. Utilizing such blank, the prior art vacuum cleaner filter bag would be formed. Initially, no glue would be pasted on the blank. After the folding of the blank, seam glue would be applied for folding the glue into a tubular form. Then, after it is folded with the appropriate gussets, glue would be applied on the bag bottom portion and the bag bottom would then be formed. However, this does not provide the necessary reinforcement for the corner regions which rip.

Accordingly, in the present invention, prior to the formation of the filter bag from the blank sheet described, specific areas will receive adhesive. It has been found, that a dry heat, self-stick or pressure sensitive type of adhesive can be applied by painting, printing or extruding the adhesive onto the blank sheet material itself. The adhesive is applied in specific areas in order to provide the necessary reinforcement for the corner regions which will normally prove the tears and rips. Specifically, the preprinted or extruded adhesive is applied adjacent each of the slits. The preprinted or extruded adhesive is applied in an L-shaped area with one of the legs lying adjacent and between each longitudinal slit and a respective side panel 62, 64, and the other leg extending beneath the slit. The L-shaped area is formed with equal legs, whereby the diagonal line extending from the slit will substantially bisect the L-shaped area.

Specifically, with reference to the slit 74, there is shown the preprinted or extruded adhesive area 96 formed as an L-shaped area having a first leg portion 98 lying adjacent and between the slit and the side panel 62, and a second leg portion 100 lying beneath the slit. It is noted that the diagonal 82 substantially bisects the L-shaped area into two sections. This will subsequently permit each of the sections to be folded onto the opposing section by folding on the diagonal line. A similar L-shaped section 102 is printed or extruded adjacent and between the slit 78 and the side panel 62. Likewise, adjacent and between the slits 80, 76 and the side panel 64 respectively, there are formed the preprinted or extruded adhesive areas 104 and 106.

At the opposing end of the blank, adjacent the transverse marginal edge 38, there is provided a transverse strip of preprinted or extruded adhesive material 108. The adhesive material is positioned within the area of the fold lines. Specifically, it is noted that it is provided adjacent the fold line 94 and extends across the fold line 92 into the region between the fold lines 90 and 92.

In the formation of the vacuum cleaner filter bag from the blank described in FIG. 2, the process will continue in its normal manner. Typically, the bags are formed of continuous strip material. The individual blanks are formed from the continuous sheet material. Then, the blanks are passed through a printing or extruding station where the specific adhesives are applied to the areas 96, 102, 104, 106 and 108, described in FIG. 2. The adhesives should be maintained dry for the subsequent folding operation. Accordingly, it can be preferably passed through a drier station after the printing or extruding in order to be sure that the adhesive is dry during the subsequent folding operation. The type of adhesive which is preprinted, or extruded can preferably be a heat, self-stick or pressure sensitive type whereby subsequent application of heat or pressure will activate the adhesive. However, prior to the application of the heat or pressure, the adhesive will remain as a dry printed or extruded area and will not affect the folding and sealing operations normally encountered in completing the filter bag.

The blanks then receive the seam glue, shown in FIG. 3. The seam glue is applied adjacent one longitudinal edge 40, and is applied as a continuous stripe 110. The seam glue is typically a wet glue and conventionally a quick set, slow drying resin adhesive is utilized. After application of the seam glue, the blanks formed are folded over whereby the two front panels 56, 58 are joined in overlapping relationship in order to form a tubular configuration. The sides are then folded to form the gussets and the front and rear panels are pressed down in order to provide for a flat configuration. The blanks are then individually cut to section off each individual bag from the continuous strip of sheet material.

One side of the bag bottom is then folded down along the front transverse fold line 68, and the sides are folded inwardly along portions of lines 66 and the diagonal fold lines 82, 84, 86, 88 to form the configuration shown in FIG. 4.

With the bag held in position shown in FIG. 4, additional glue is provided in order to subsequently seal the bag bottom. Specifically, L-shaped sections of glue 112, 114 are formed across the exposed surfaces of the bag bottom. These areas include a short upper leg extending adjacent to and laterally of the notch 72 and a corresponding elongated leg extending longitudinally across the entire exposed surface. The glue provided is again of the conventional quick set, slow drying resin adhesive type, which is typically applied in a wet condition.

After application of the glue, as shown in FIG. 4, the bag bottom is folded with the lower panel 116 initially folded along lower line 66 onto the side panels, and subsequently the upper panel 118 is folded over along upper line 66 as the final panel. The two short legs of glue will thereby be utilized to hold down the final panel. It should be noted, that utilizing the conventional processing, no adhesive is applied adjacent the corner areas 120. It is those areas 120 which form the subsequent tears as shown. However, as can best be seen in FIG. 5, it is specifically at these corner areas 120 where the preprinted or extruded adhesive has been applied. The preprinted or extruded adhesive areas are shown in dotted line in each of the corners, and it is clear that it is these preprinted or extruded adhesive areas which seal the corners and provide reinforcement against the subsequent tears and rips which generally occur during operational use.

The opposing end of the bag is then sealed off. As shown in FIG. 6, two stripes 122, 124 of glue are applied to the external bag surface 12 of the rear panel 60. Then, the bag is folded on fold line 92 forming a first folded cuff 126, which is glued by stripe 122, as shown in FIG. 7. Subsequently that cuff is folded over on fold lines 90 and 94, which are superimposed, to form the final cuff 24 as shown in FIG. 8, which is glued by stripe 124. The preprinted or extruded adhesive area 108 is shown in dotted line in FIG. 6. This area is actually internal of the filter bag and will be included between the fold lines 92 and 94, and preferably extending over the fold line 92. Thus, the preprinted or extruded adhesive will actually form the necessary reinforcement needed at these edges which normally tear and rip.

After the final formation of the bag, following the conventional gluing and folding steps, the completed bag is then passed through a heated or pressure section. For example, it can be passed through a series of heated or pressure rollers, or it can be passed through a heated platen. The heat activates the preprinted or extruded heat sensitive adhesive, where the pressure rollers affects the self-stick or pressure sensitive adhesive, and thereby glues together the sections which need the necessary reinforcement in order to prevent the tears.

Accordingly, it should be appreciated that the present invention provides reinforcement without necessarily adding complexity or difficulty in the manufacture. The manufacture can actually follow the conventional steps, utilizing conventional blanks with conventional techniques. The only addition is that there is provided preprinted or extruded areas of heat, self-stick or pressure sensitive adhesives. This heat, self-stick or pressure sensitive adhesive does not interfere with the normal gluing and sealing of the bag. However, after completion of the bag, the preprinted or extruded areas are then activated by passing the bag through heat or pressure.

In addition to the foregoing type of filter bag, the present invention can also be applied to other configurations of filter bags. For example, referring now to FIG. 9, there is shown a different type of filter bag also utilized in the prior art. The filter bag is shown generally at 130 and is of a type which has been described in U.S. Patents 3,350,859 and 3,559,381. Both of those patents are herein incorporated by reference. A full description of the formation of the bag and its features will not be included herein. However, only for the purpose of explaining the present invention, there will be provided a brief description of the filter bag and its construction.

The filter bag 130 includes a rear panel 132, a front panel 134 and accordian type side panels 136. The top and the bottom edges of the tubular bag are folded over forming the cuffs 138 and 140. A connecting tube 142 is coupled to the tubular filter bag. Registered openings between the connecting tube 142 and the rear wall 132 of the filter bag permit access into the filter bag receptacle. The lower end 144 of the connecting tube is coupled to the outlet of the vacuum cleaner. The air to be filtered passes through the connecting tube and then through the registered openings and into the filter bag for collection of the dirt particles therein.

It will be noted, that with the prior art type of filter bag, there is a tendency for tears and rips to occur, especially at the folded over edges forming the cuffs. As shown, at the edge of the cuff 138, there is tendency for a tear and ripped area 146 to occur. Similarly, at the cuff region 140, there is tendency for a tear area 148 to occur. These occur during the course of continued use of the bag. Accordingly, specific reinforcement is needed in order to prevent these tears and rips from occurring.

Figure 10:
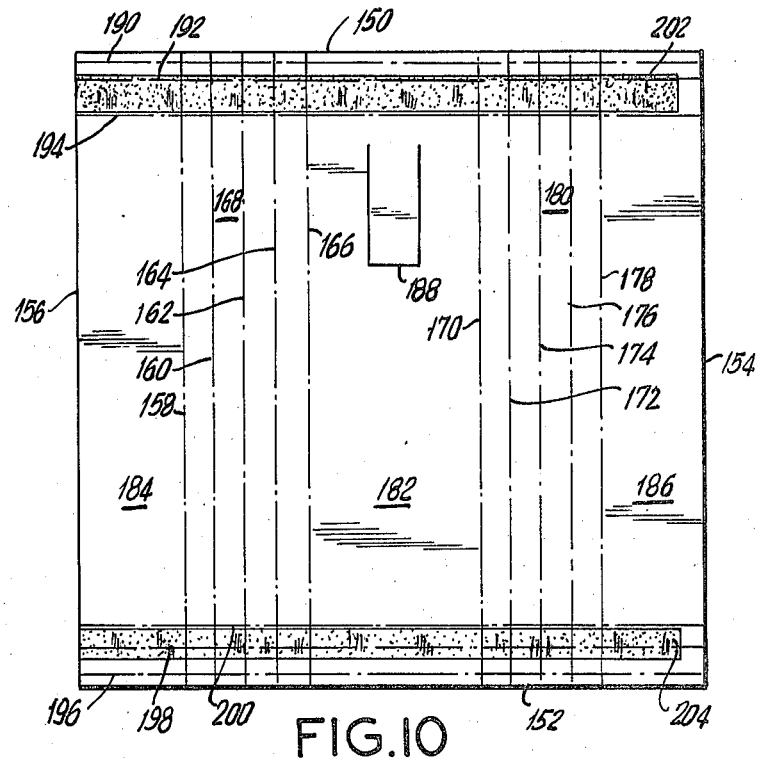
FIG. 10 is a plan view of a blank utilized in the manufacture of the type of filter bag of FIG. 9, and including the features of the present invention.

FIG. 10 shows a typical blank utilized in the formation of the bag shown in FIG. 9, modified according to the present invention. Accordingly, it also includes the preprinted or extruded areas of the present invention which will provide the necessary additional adhesives for reinforcing the bag against the tears and rips of the prior art. Specifically, the blank includes the transverse marginal edges 150 and 152, and the longitudinal marginal edges 154, 156. A plurality of longitudinal fold lines are formed. Specifically, the series of longitudinal lines 158, 160, 162, 164 and 166 form the accordian type panel identified generally as 168. A corresponding plurality of longitudinal fold lines 170, 172, 174, 176 and 178 form the side panel 180 also of the accordian type. Between the fold lines 166 and 170 is provided the rear panel 182, and the area between the fold line 158 and the edge 156, identified as area 184, forms part of the front panel which will be sealed with the other part of the front panel 186 formed between the fold line 178 and the marginal edge 154.

A U-shaped flap 188 is formed in the rear panel 182 in order to form the access for connection thereto of the connecting tube.

At each end, three transverse fold lines are formed. Adjacent the marginal edge 150, the transverse fold lines 190, 192 and 194 are formed. Similarly, at the opposing end, three transverse fold lines 196, 198 and 200 are formed. These fold lines are utilized for forming the cuffs at the opposing ends for sealing off the ends of the filter bag.

The blank thus far described is substantially similar to that in the aforementioned patents. However, in the present invention, prior to the formation of the filter bag from the blank, heat or pressure sensitive adhesive areas are applied. Specifically, at the edge adjacent the margin 150 there is provided a stripe of heat or pressure sensitive adhesive material 202. The adhesive material extends within the area covered by the transverse fold lines, and specifically commences adjacent the fold line 194 and extends over the fold line 192. A corresponding adhesive stripe 204 is formed adjacent the opposing marginal edge 152 and commences adjacent the fold line 200 and extends across the fold line 198. It should be noted, that the printed or extruded stripes 202, 204 could extend entirely across the entire transverse width of the blank. However, in the embodiment shown, they terminate slightly short of the entire width and specifically slightly spaced from the longitudinal marginal edge 154.

Referring now to FIGS. 11–18, the folding and sealing of the filter bag from the blank shown in FIG. 10 will be described. Initially, a stripe of glue is applied on one of the parts of the front panel along one of the edges, typically shown on the part 184 at the longitudinal marginal edge 156. The glue stripe 206 serves as the seam glue and permits the opposing portions of the front panel 184, 186 to be folded over each other to form a tubular configuration. The seam glue, as typical with other glue applied during the actual formation, is a wet glue which is a quick set, slow drying, resin adhesive. After the tubular configuration is formed, the conventional connecting tube 142 is added. An area 210 of adhesive material, such as the conventional wet glue, is applied around the opening 208. The connecting tube is then sealed in flow communication with the main body of the filter bag.

Figures 11, 12, 13:
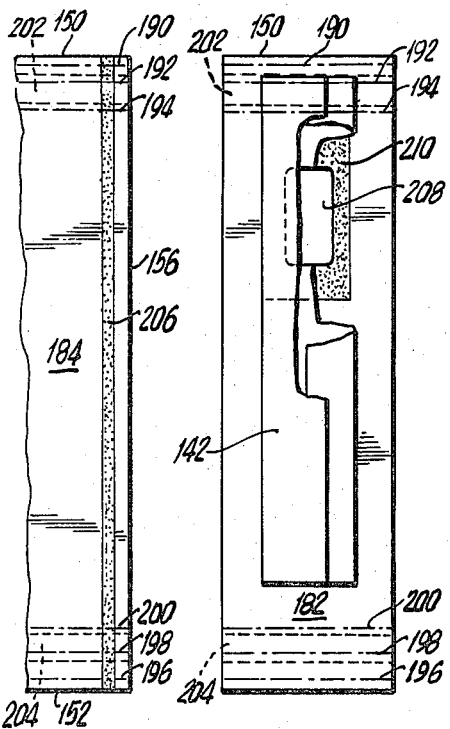
FIG. 11 shows a fragmentary edge view of the blank and specifically showing the application of glue for a seam during the course of manufacture of the filter bag.
FIGS. 12, 13, 14 and 15 show successive steps in the application of a connecting tube to the filter bag, the closing of the one end of the filter bag, and the simultaneous attaching of the connecting tube.
Figures 14, 15:
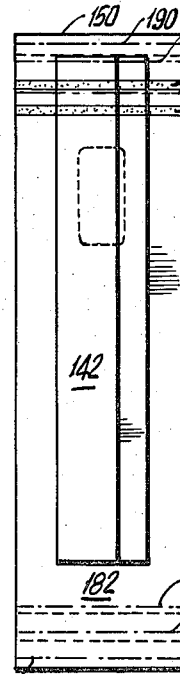

The upper edge of the filter bag is then folded over so as to include the upper end of the connecting tube, whereby the connecting tube will be interfolded along with the folding of the cuff. The cuff is initially folded along fold line 192 to form a first fold over, which is glued by the stripe 214, as shown in FIG. 14. Subsequently, the cuff is folded along the superimposed fold lines 190 and 194 to form the final cuff as shown in FIG. 15, which is glued by the stripe 212. In order to seal the cuff, the two stripes of glue 212, 214 are applied prior to the folding over of the cuffs, where both stripes extend across the connecting tube 142 as shown in FIG. 13.

Figure 16:
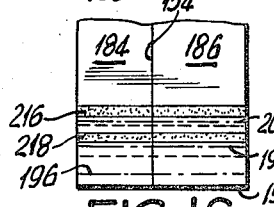
FIGS. 16, 17 and 18 show successive steps in the closing off of the opposing end of the filter bag.
Figure 17:
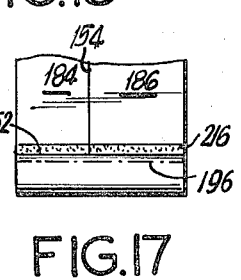
Figure 18:
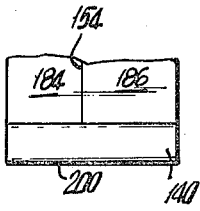

At the opposing end, again two stripes of adhesive 216, 218 are applied as shown in FIG. 16, and then the opposing edge is folded over. Initially, it is folded along the fold line 198 as shown in FIG. 17, and glued by stripe 218. Finally it is folded along the superimposed fold lines 196 and 200 and glued by stripe 216 in order to form the final lower cuff 140, as shown in FIG. 18.

It should be appreciated that within the upper and lower cuffs there is included the preprinted or extruded adhesive material. Accordingly, after the folds have been completed and the cuffs formed, the completed bag is passed through a heat or pressure sensitive area to activate the preprinted or extruded adhesive material. The preprinted or extruded adhesive material, which is disposed within the cuffs, will provide the necessary reinforcement at the corner areas which normally tend to tear and rip during usage.

Although two specific embodiments have been shown, it is understood that other types of filter bags can also be made utilizing the present invention. The areas needing reinforcement are preprinted or extruded on the blank with adhesive which does not interfere with the usual processing and manufacturing of the filter bag. However, subsequently, after the filter bag is completed, these areas are heat or pressure activated so that the adhesive provides the necessary reinforcement for those corners which normally would be subject to tears and rips.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What is claimed is:

1. A vacuum cleaner filter bag formed from a blank of air permeable filter sheet material folded to define a tubular bag having closed ends, said filter bag comprising access means provided in said tubular bag for permitting passage of air to be filtered into an interior of said tubular bag, first adhesive means applied on specified areas of the blank for sealing said tubular bag in a folded condition, and second adhesive means preapplied onto the blank in other specified areas and adjacent to said closed ends of said tubular bag for preventing tears at said closed ends, said second adhesive means being a different type of adhesive than said first adhesive means.

2. A vacuum cleaner filter bag as in claim 1, wherein said second adhesive means is at least one of a heat, self-stick and a pressure sensitive adhesive and is preapplied by at least one of preprinting and extruding onto an inner surface of the blank.

3. A vacuum cleaner filter bag as in claim 2, wherein said first adhesive means is a quick setting, slow drying, resin adhesive.

4. A vacuum cleaner filter bag as in claim 3, wherein said tubular bag includes a front wall, a rear wall, and opposing sides, said tubular bag being closed on one end with an opposite end thereof having a bottom portion, said access means being disposed in said bottom portion, said bottom portion being folded from a rectangular configuration having side sections and front and rear sections with said side sections being folded down and said front and rear sections being folded thereon, said second adhesive being located on inner surfaces of the front and rear sections adjacent said side sections for securing the folded side sections, and said first adhesive being located on at least outer surfaces of said side sections for securing the folded down front and rear sections.

5. A vacuum cleaner filter bag as in claim 4, wherein said second adhesive is also located inside said tubular bag as a stripe adjacent said closed one end, and said first adhesive is also located on an outside surface of said tubular bag adjacent said closed one end.

6. A vacuum cleaner filter bag as in claim 3, wherein said tubular bag including a front wall, a rear wall, and opposing sides, said tubular bag being closed at both ends, said access means being disposed in said rear wall of said tubular bag, said second adhesive being located inside said tubular bag as a stripe adjacent both closed ends thereof, and said first adhesive being located on outside surfaces of said tubular bag adjacent both closed ends, whereby said ends are folded over for sealing the tubular bag, being sealed by said first and second adhesive means.

7. A vacuum cleaner filter bag as in claim 6, and further comprising a connecting tube defining an elongated tube having an open lower end and an upper end adjacent a top end of said tubular bag, said connecting tube having an opening registering with said access means in said tubular bag, said connecting tube being joined to said tubular bag by said first adhesive interposed between said connecting tube and said tubular bag and surrounding said registered opening, and the upper end of said connecting tube and the top end of said tubular bag being folded together and held by at least said first adhesive.

8. A blank for a vacuum cleaner filter bag, said blank comprising a sheet of air permeable filter material provided with a pair of transverse edges and a plurality of elongated fold lines for defining therebetween a first panel, side panels, and a rear panel when said blank is folded thereon, a cut-out section provided on said blank for defining access means into the filter bag, and at least one of heat, self-stick and pressure sensitive adhesive means pre-applied in stripes on said blank adjacent said transverse edges for preventing tears at the edges of the bag when in a folded condition.

9. A blank for a vacuum cleaner filter bag as in claim 8, wherein said blank further includes two spaced apart upper transverse fold lines adjacent one of said transverse edges, a portion between said upper transverse fold lines and said one transverse edge defining a bag bottom when the blank is folded thereon, a generally U-shaped cut-out portion at said one transverse edge provided in both the front and rear panels, longitudinal slits provided in said front and said rear panels spaced on either side of each U-shaped cutout, said slits extending from said one transverse edge partway toward a first one of said upper transverse fold lines, diagonal fold lines extending from ends of the slits in the rear panel to intersect with diagonal fold lines extending from ends of the slits in said front panel, said diagonal fold lines intersecting along the second one of said upper transverse fold lines, said pre-applied adhesive means including an L-shaped area of adhesive adjacent each of said slits with the diagonal fold line extending from each slit bisecting the associated adjacent L-shaped area.

10. A blank for a vacuum cleaner filter bag as in claim 9, wherein said blank further includes a plurality of lower spaced apart fold lines adjacent the opposing transverse edge for folding up a top end of the bag onto itself to close off the top end, and wherein said pre-applied adhesive means further includes a transverse stripe positioned within an area of the lower transverse fold lines.

11. A blank for a vacuum cleaner filter bag as in claim 10, wherein said transverse stripe extends from adjacent an innermost one of said lower transverse fold lines and across the next outwardly adjacent lower transverse fold line.

12. A blank for a vacuum cleaner filter bag as in claim 8, wherein said blank includes a plurality of spaced apart transverse fold lines adjacent each of said transverse edges for folding up each end of the bag onto itself when the blank is folded into the bag, said pre-applied adhesive means including a transverse stripe adjacent each transverse edge and within an area having the transverse fold lines, and wherein said cut-out section is provided in the rear panel.

13. A blank for a vacuum cleaner filter bag as in claim 12, wherein said transverse stripe at each end extends from adjacent an innermost one of said transverse fold lines and across the next outwardly adjacent transverse fold line.

* * * * *